July 10, 1934.    E. G. LOOMIS    1,965,844
APPARATUS FOR PREPARING PACKINGS
Filed Feb. 5, 1930
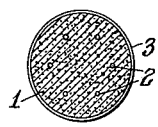
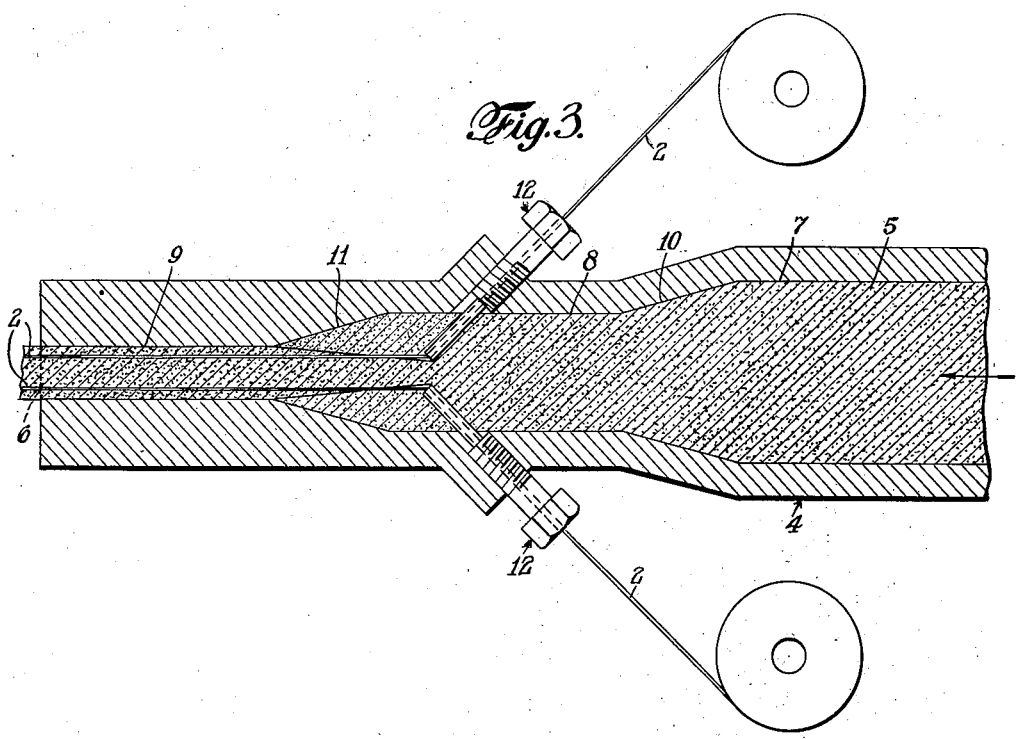
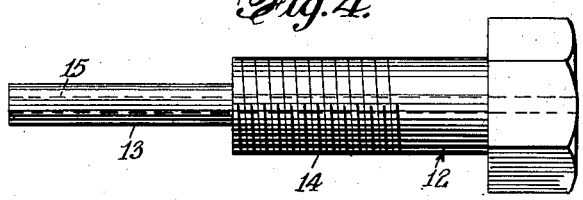
INVENTOR
Evarts G. Loomis
BY
Wm. J. Pritchard
ATTORNEY Patented July 10, 1934

1,965,844

UNITED STATES PATENT OFFICE 1,965,844

APPARATUS FOR PREPARING PACKINGS

Evarts G. Loomis, Newark, N. J., assignor to The Dorin Corporation, Union City, N. J., a corporation of New Jersey Application February 5, 1930, Serial No. 426,073

1 Claim. (Cl. 18—13)

In copending application Serial No. 426,072, filed February 5, 1930, there has been described and claimed a packing having a high internal strength capable of successfully resisting the stresses occasioned by distortion resulting from pulling, bending, flexing, coiling or the like, and a method of making the same. This packing possesses a high internal strength and comprises a molded packing composition reinforced with a strand or plurality of strands of a flexible material incorporated therein and extending, preferably, longitudinally therethrough. If desired it may be wrapped, preferably spirally with the adjacent convolutions overlapping, with any easily disruptible, frangible and non-abrasive material, including ribbons of regenerated cellulose, silk, both natural and artificial, and the like.

To make this packing a commercial success, it is essential that an economical and practical apparatus for producing the same be devised.

It is therefore an object of this invention to provide an apparatus for producing packings of the type above-mentioned.

A specific object of this invention is to provide an apparatus for preparing packings having a high internal resistance which comprises means for molding a packing composition and incorporating therein at some stage of the process a strand or plurality of strands of a flexible material.

Additional objects will appear from the following description, appended claim and accompanying drawing forming a part of this invention and in which:

Figure 1 is a perspective view of a packing prepared in accordance with the principles of this invention.

Figure 2 is a cross-section of the packing illustrated in Figure 1.

Figure 3 illustrates one form of a die mechanism capable of being employed in the manufacture of the packing material.

Figure 4 is a detail illustration of the means for embedding the strand in the packing composition.

According to this invention, a plastic packing composition of any desired composition is pressure molded by being extruded through any suitable shaping mechanism, such as a die, whereby it is given a definite shape and length. At some stage in the shaping or the extrusion a strand or plurality of strands of a flexible material is embedded in the composition in such a manner that it is incorporated and extends longitudinally through the product. The incorporated strand reinforces the product and imparts thereto a relatively high internal strength which permits distortion and pulling without any substantial disintegration. To more clearly explain the invention, reference is made to the accompanying drawing in which like reference numerals designate like parts or elements.

Referring now to Figures 1 and 2, wherein the product resulting from the method herein described is illustrated, the reference numeral 1 designates the molded or extruded packing composition of any type and the reference numeral 2 designates the strand incorporated therein. For reasons which will become apparent, the packing may be provided with a covering 3, preferably a spiral wrapping of a frangible material.

The above-described packing may be made in various manners. In Figure 3 there is illustrated one form of an apparatus which may be employed to produce the packing. This device consists of a die member 4 having a passage or molding cavity 5 extending therethrough and terminating at one end thereof in an opening 6 through which the packing composition is discharged from the device. The shape and size of this opening depends on the desired cross-section of the packing. If the packing is to be circular in cross-section, then this hole is made round; on the other hand, if the packing is to be made elliptical, square or of any other configuration, then this aperture is made of the corresponding contour. The other terminus of the cavity is suitably connected to any well known means for supplying and feeding the packing composition to be processed in the die.

The passage or molding cavity 5 is preferably made with progressively decreasing cross-sections, as indicated by the reference numerals 7, 8 and 9. Between the various differently sized cross-sections there are provided shoulders 10 and 11 which facilitate in reducing the material to the desired final size as well as finish the surface of the packing.

Suitably disposed in the die member intermediate the ends thereof, and preferably adjacent the shoulder 11, are means which simultaneously groove or channel the composition and insert the strand 2 in the groove. One form of construction which this means may take comprises a bolt-like member 12 having a shank, the lower terminal portion 13 thereof being smaller in cross-section than the threaded portion 14. By means of the threads cooperating with a threaded hole in the die, the member 12 may be adjustably mounted in any predetermined position. In the drawing (see Figure 3), the member 12 is illustrated as being disposed at an angle to the horizontal axis of the die. This arrangement somewhat reduces the resistance between the portion 13 and the composition contacting therewith. The member 12 may be hollow or bored to provide a passage 15 extending through the center thereof for guiding the strand 2 from its source of supply to the groove, as will presently appear. When mounted in proper position the terminal portion 13 extends and projects into the die cavity 5, as clearly illustrated in Figure 3, and serves to form a channel or groove in the material engaging therewith. The strand 2, suitably disposed on a freely rotating spool, is fed through the passage 15 by the movement of the composition, and, as the latter is grooved, it is disposed therein. As the composition engages the shoulder 11 and is forced through the portion of the cavity designated by the reference numeral 9, the cross-section thereof is reduced and the channeled surface substantially eliminated, whereby the strand 2 is embedded in the mass and hidden from view upon exit from the aperture 5.

It is, of course, to be understood that this invention is not restricted to a single means simultaneously functioning to both groove the composition and lay the strand in the groove. If desired, separate individual mechanisms to effect each of these results may be provided.

The number of mechanisms for grooving the composition and embedding the strand depends on the number of reinforcing elements desired in the final product. If, for instance, a single reinforcing element is desired, then only one such member is necessary. On the other hand, if a plurality of reinforcing elements is desired, then a corresponding number of these mechanisms are employed.

Due to the threaded construction and arrangement, the member 12 may be adjusted to any desired position. Thus, the reinforcing elements may be located at any predetermined position in the product.

The reinforcing elements may be formed of any of a number of materials. For instance, they may be strands, such as threads or cords of any textile material, including cotton, hemp and artificial silk, or they may be formed of rubber, wire and the like. The only prerequisite is that the reinforcing elements be of such a composition or material that does not interfere with the successful operation of the packing material in its intended use.

The packing material, as it comes from the die, possesses a high internal strength. It is capable of withstanding the stresses occasioned by distortion and longitudinal pull.

The product, if desired, may be encased or coated with any frangible and easily disruptible materials. It is obvious that numerous materials are suitable for this purpose. I prefer to spirally wrap a ribbon of material, such as regenerated cellulose, natural or artificial silk, in such a manner that the adjacent convolutions thereof overlap. The wrapping operation may be carried out, in any well known manner, on the molded product as it leaves the die or at any other subsequent time.

This invention is not restricted to any specific packing composition. It may be successfully practiced with compositions comprising finely divided anti-friction metallic materials, asbestos and/or other fibers, and graphite, admixed with a suitable binder, such as an oil or wax, or a composition binder, including a colloidal hydrocarbon, such as rubber, homogeneously mixed with menhaden oil.

Though this invention has been particularly described in connection with the preparation of packing materials, the invention is not restricted thereto. It is obvious that it may be employed with equal success in molding various plastic compositions including cellulose ester and ether compositions, viscose, gums, gelatine, wax and rubber.

Since it is obvious that various changes and modifications may be made in the specific details above described, this invention is not restricted thereto except as defined by the appended claim.

I claim:

An apparatus for forming molded packing comprising an extrusion die having a molding cavity through which the composition to be shaped is forced, and one or more hollow strand guiding members screw threaded into said die and extending into the molding cavity and adapted to be adjusted toward and from the horizontal axis of the molding cavity.

EVARTS G. LOOMIS.